US008418044B2

(12) United States Patent
Bhattad et al.

(10) Patent No.: US 8,418,044 B2
(45) Date of Patent: Apr. 9, 2013

(54) PARITY ERROR CORRECTION FOR BAND-LIMITED DIGITAL SIGNALS

(75) Inventors: Nilesh Bhattad, Bangalore (IN); Suraj Sreekanta, Bangalore (IN)

(73) Assignee: Analog Devices, Inc., Norwood, MA (US)

( * ) Notice: Subject to any disclaimer, the term of this patent is extended or adjusted under 35 U.S.C. 154(b) by 0 days.

(21) Appl. No.: 13/423,754

(22) Filed: Mar. 19, 2012

(65) Prior Publication Data

US 2012/0192030 A1    Jul. 26, 2012

Related U.S. Application Data (63) Continuation of application No. 11/957,421, filed on Dec. 15, 2007.

(51) Int. Cl.
*G06F 11/00* (2006.01)
*H03M 13/00* (2006.01)

(52) U.S. Cl.
USPC .......................................................... 714/800

(58) Field of Classification Search .................. None
See application file for complete search history.

(56) References Cited

U.S. PATENT DOCUMENTS

| 4,486,876 | A  | 12/1984 | Gaunt et al.   |
| 4,809,274 | A  | 2/1989  | Walker et al.  |
| 5,481,542 | A  | 1/1996  | Logston et al. |
| 6,914,637 | B1 | 7/2005  | Wolf et al.    |
| 2005/0155085 | A1 | 7/2005 | Thaly et al.   |
| 2006/0085727 | A1 | 4/2006 | Azenkot et al. |

OTHER PUBLICATIONS

Bower, A.J., "Digital Two-Channel Sound for Terrestrial Television," BBC Research Department Report, Jun. 1990, pp. 1-27.
Bower, A.J., "Digital Two-Channel Sound for Terrestrial Television," IEEE Transactions on Consumer Electronics, vol. CE33, No. 3, Aug. 3, 1987, pp. 286-296.

*Primary Examiner* — Guerrier Merant
(74) *Attorney, Agent, or Firm* — Kenyon & Kenyon LLP (57) ABSTRACT

An error correction method corrects and replaces erroneous digital signal samples (having N companded bits) in a receiver after ascertaining by parity check that a sample is erroneous. The method chooses M MSBs where M is less than or equal to N, and produces M test samples, each test sample being obtained by inverting a single bit from the M bits, keeping other bits unaltered. Each test sample is expanded and passed through a selected low pass filter (e.g., 15 kHz) to obtain a filtered output and a differential value between the test sample and its filtered output. The test sample producing the least differential value is chosen to replace the erroneous signal sample. The technique is applicable in NICAM demodulators receiving 14 bit sample signals (at 32 kHz) companded to (N) 10 bits from which (M) 6 MSB parity encoded bits are chosen for producing test samples.

24 Claims, 5 Drawing Sheets

PARITY ERROR CORRECTION FOR BAND-LIMITED DIGITAL SIGNALS

CROSS-REFERENCE TO RELATED APPLICATIONS

This is a continuation of U.S. patent application Ser. No. 11/957,421 filed Dec. 15, 2007, which is incorporated herein by reference in its entirety.

FIELD OF THE INVENTION

The invention relates generally to a novel method of parity error correction in signals which are transmitted digitally along with a parity bit, and more particularly to parity error correction in digital communication of band limited digital signals.

BACKGROUND OF THE INVENTION

A brief discussion about parity checking is believed to be conducive to an understanding of the present invention. Parity checking as known in communication technology refers to the use of parity bits to check that data has been transmitted accurately. The parity bit is added to every data unit (typically seven or eight bits) that is transmitted. The parity bit for each unit is set so that all bytes have either an odd number or an even number of set bits. Assume, for example, that two devices are communicating with even parity (the most common form of parity checking). As the transmitting device sends data, it counts the number of set bits in each group of seven bits (—one data unit—). If the number of set bits is even, it sets the parity bit to 0; if the number of set bits is odd, it sets the parity bit to 1. Consequently, every byte has an even number of set bits. On the receiving side, the device checks each byte to make sure that it has an even number of set bits. If it finds an odd number of set bits, the receiver knows there was an error during transmission. The transmitting device and receiver must both agree to use parity checking and to agree on whether parity is to be odd or even. If the two sides are not configured with the same parity sense, the foregoing method parity checking in communication will not be feasible.

Parity checking is the most basic form of error detection in communications. Although parity checking detects many errors, it is not foolproof, because it cannot detect situations in which an even number of bits in the same data unit are changed due to electrical noise. Parity checking is used not only in communications but also to test memory storage devices. Many PCs, for example, perform a parity check on memory, every time a byte of data is read.

Simple bit interleaving and scrambling can be applied to make the generated symbol patterns appear more at random and with minimal self-correlation, thereby avoiding false locks at the receiver.

To some degree, bit interleaving and scrambling can combat the effects of burst noise.

A brief discussion of NICAM is believed to be conducive to an understanding of one of the applications of the present invention. NICAM stands for "Near Instantaneous Companded Audio Multiplex", the "Near Instantaneous Companding" being due to the fact that 1 ms worth of sound data has to be input before the companding process can do its work. The "Audio Multiplex" term implies that the system is not limited just to stereo operations.

NICAM in one known form currently offers the following possibilities, auto-selected by the inclusion of a 3-bit type field in the data-stream:

One digital stereo sound channel.
Two completely different digital mono sound channels.
One digital mono sound channel and a 352K bit/sec data channel.
One 704K bit/sec data channel,
Only the first two of the ones listed are known to be in general use presently however.

In the above referenced known form of NICAM given by way of example herein,
Sound is digitized to 14 bits accuracy at a sampling rate of 32 kHz.
The upper frequency limit of a sound channel is 15 kHz due to anti-aliasing filters at the encoder.
The 14 bit original sound samples are companded digitally to 10 bits for transmission.

Error detection in prior art is a very common practice in digital communications. Some techniques in known art to handle errors that occur during communication are as follows:

1. A common practice is that when an error is detected at the receiver, the receiver sends back a signal to the transmitter, requesting that the signal be retransmitted, either in full or parts.
2. Some other error concealment techniques are used, which do just what the name suggests—hide the error as best as possible. Three that are noteworthy are:
   a)—using average of the 2 adjacent samples in place of the erroneous sample.
   b)—using either of the 2 adjacent samples in place of erroneous sample.
   c)—low pass filtering the signal which has error, to conceal the error.

It is known that errors are difficult to avoid in transmission channels. Accordingly, at the receiver a twofold job is generally required, including error detection and error correction. Error detection is a standard procedure in any receiver and is generally done using a parity bit as discussed supra, which is transmitted along with the data itself. But, with the presently available methodology, reliable error correction is a difficult operation to perform. Techniques mentioned supra as exemplified in point 2 (c) are merely error concealment techniques, and do not provide error correction in the real sense.

There is presently no simple known efficient correcting technique which corrects the erroneous sample instead of concealing the error.

DESCRIPTION OF THE INVENTION

Presented herein is an error correction technique for error correction in digital communication of band limited signals, in convolution with the companding scheme specified to be used. The digital signal source in the present invention generates signal samples with a known number of bits (for example K bits) to be received at the receiver. For purposes of this invention, companding comprises the entire process of compression of the initial (K) bits to a smaller or equal number (N) of bits by the transmitter, and at the receiver, expanding the compressed number (N) to the original number of bits (K). N may be less than K, or equal to K where there is no companding.

In one form, the invention resides in a method of correcting and replacing an erroneous digital source signal sample containing K bits which are compressed to N bits, and added with a parity bit considering parity of M of the N bits which are transmitted and sent to a receiver, wherein N is less than K or equal to K with no companding, and M is less than or equal to N (—equal when all N bits are considered for parity check—)

and wherein signal samples received in the receiver are expanded back to K bit samples as applicable, wherein parity check is used for ascertaining whether the digital source signal sample received by the receiver is an erroneous signal sample, following which the method of error correction comprises the steps of: choosing the necessary M bits from expanded samples of K bits in each erroneous signal sample, following and producing M inverted test samples each with K bits, wherein each of the M inverted test samples is obtained by inverting a single one of the M bits and keeping all other (K−1) bits unchanged; passing each of the M inverted test samples through a selected filter and obtaining a filtered output in each case, and for each of the M inverted test samples measuring a difference in value between each inverted test sample and its corresponding filtered output; and, selecting that value of the difference which is minimum, and choosing a corresponding inverted test sample of K bits for replacing the erroneous signal sample.

The present invention uses an algorithm, which is based on the following process/sequence, wherein the erroneous digital source signal sample contains K bits companded to N bits (N being equal to less than K) and wherein M bits are considered for parity (M being less than or equal to N):

1. Only 1 of M possible parity bits of any erroneous sample could be in error.
2. Expediently, these M bits are inverted, only 1 bit at a time, to get M modified N-bit samples for each erroneous sample. Thus, test samples are obtained from the sample sets each containing an inverted bit. Each N-bit test sample is then expanded to K-bits.
3. Now, in the stream of K-bit samples, if any sample is indeed in error, then there are M other possible values of the test sample to choose from to arrive at the original (correct) value.

In a second form, the present invention resides in an error correction technique and method for correcting and replacing an erroneous digital signal source sample in a receiver after ascertaining by parity check that the digital signal source sample is erroneous, wherein the digital signal source sample has N bits, comprising the steps of: choosing M parity encoded bits (which are used for parity bit insertion by the transmitter) bits from the N bits in each said erroneous sample and producing M inverted test samples each with N bits, M being less than or equal to N, wherein each of said M inverted test samples is obtained by inverting a single one of the M bits and keeping all other (N−1) bits unchanged; passing each of the M inverted test samples through a selected filter and obtaining a filtered output in each case, and for each of the M inverted test samples measuring a difference in value between each inverted test sample and its corresponding filtered output; selecting that value of the difference which is minimum, and choosing a corresponding inverted test sample with N bits for replacing the erroneous signal sample.

In yet another form given purely as an example, the invention resides in a method for correcting and replacing an erroneous digital signal sample from a band limited signal source received in a receiver after ascertaining by parity check that the digital signal sample is erroneous, wherein the digital signal sample has 14 bits compressed to N bits and expanded back to 14 bits as applicable, and wherein M bits are considered for parity check, N being equal to less than 14 and M being equal to or less than N, said method being implemented for error correction in a NICAM (Near Instantaneous Companded Audio Multiplexed) demodulator, and comprising the steps of: choosing the necessary N1 parity encoded bits from expanded samples of 14 bits in each erroneous sample and producing M number of inverted test samples each with 14 bits, wherein each of the M inverted test samples is obtained by inverting a single one of the M bits and keeping all other remaining 13 bits unchanged; passing each of the M inverted test samples through a selected filter and obtaining in each case, and for each of said M inverted test samples measuring a difference in value between each inverted test sample and its corresponding filtered output; selecting that value of the difference which is minimum, and choosing a corresponding inverted 14 bit test sample for replacing the erroneous signal sample. In one example, M is 6 most significant (parity encoded) bits.

The invention also includes a computer readable medium encoded with data/instruction which when executed by a computing platform results in execution of a method or technique as stated above.

The approach of the invention can be explained for example by considering the parity bit insertion in the transmitter and the corresponding error correction block in the receiver. the transmitter, a stream of K bit samples (for example, 14 bit samples at 32 kHz for example) is compressed, producing N-bit samples (for example, 10-bit sample) which are subsequently transmitted along with a parity bit. The inclusion of the parity bit results in N+1 bits (11-bits) transmitted per sample. The reasoning behind doing this is that the transmitter specifies the parity bit as 0 or 1 to communicate to the receiver if the number of '1's of the N-bit sample is odd or even, which is known to the receiver a-priori. Hence, when the receiver receives this data, it checks for the parity of the set of M-bits in each set of (N+1) bits. If the parity matches with what it should be, the receiver interprets that there has been no error in communication. If on the other hand, the parity is not what it should be, then it concludes that there has been error in transmission. This technique known as error detection using parity bit, as discussed supra, does not provide error correction but only detection.

In the present example, the N (10) bit samples are subjected to parity check using only 6 MSBs for parity, as a preferred example. At the receiver, after de-scrambling and de-interleaving, the N (10) bit samples are subjected to parity check using a parity bit generated using only M (6) bits. Front this it is known that only one of the 6 MSBs could be in error. It is noted that N is less than or equal to K, and M is less than or equal to N. In order to strengthen parity protection for the sound samples in NICAM as the example, the parity bit is calculated on only the top six bits of each sample i.e., on 6 MSBs, not all ten. This is because tests have shown that uncorrected errors in the least significant four bits were not significant enough and did not reduce the efficacy of the overall process substantially.

In case the source signal (which was digitized, coded and modulated before transmission) is a band-limited signal, the technique presented herein aims to correct the errors at the receiver. Expediently, a low pass filter is deployed for the purpose, the bandwidth of the tow pass filter being just enough to pass the highest frequency that is estimated to be present in the correct source sample signal. The highest frequency present in the band-limited signal source needs to be known for the purpose of selecting the low pass filter. It is known from the parity check which samples are in error and which are not. When an erroneous sample is detected, the signals are passed through the low pass fitter M-times, each time inverting only one of the M appropriate bits of the erroneous sample and keeping all other bits the same. Now, the filter input and output in each of these M cases are compared. That case, in which the fitter input and output are closest to each other, is the case in which the error has been corrected. Hence, the erroneous sample is replaced by this value for further processing.

BRIEF DESCRIPTION OF THE DRAWING

A more detailed understanding of the invention may be had from the following detailed description, given by way of example and to be understood in conjunction with the accompanying drawing wherein.

DETAILED DESCRIPTION

A detailed description of one or more embodiments of the invention is provided below in the context of the accompanying figures that illustrate by way of example the principles of the invention. While the invention is described in connection with such embodiments, it should be understood that the invention is not limited to any embodiment. On the contrary, the scope of the invention is limited only by the appended claims and the invention encompasses numerous alternatives, modifications and equivalents. For the purpose of example, numerous specific details are set forth in the following description in order to provide a thorough understanding of the present invention.

The present invention may be practiced according to the claims without some or all of these specific details. For the purpose of clarity, technical material that is known in the technical fields related to the invention has not been described in detail so that the present invention is not unnecessarily obscured.

An exemplary application of the present invention is presented in the context of error correction in NICAM demodulator, in convolution with the companding scheme specified to be used. A stream of 14-bit samples at 32 kHz is the starting point data that the transmitter works with. These 14-bit samples are first compressed according to the specified companding scheme, thus generating 10-bit samples at 32 kHz to be used for transmission.

These 10-bit samples are then parity added (considering only the 6 MSBs for parity), bit-interleaved and scrambled before they are used to generate frames of 32 samples each at 1 frame/ms. Even though bit interleaving and scrambling could combat the effects of burst noise to minimize their effects, the 10-bit samples that are available at the receiver after de-scrambling and de-interleaving still might have some errors inherent to most transmission channels. These errors can be detected from a parity check. Presented herein is an error correction technique to counter errors, the technique being applied to NICAM application.

At the receiver, after de-scrambling and de-interleaving, the 10-bit samples are checked for parity errors. If parity errors are found, a reasonable assumption is made that only 1 bit of the erroneous sample could be in error (there is very low probability that more than 1 bit in the same sample is in error). But, in case parity error is detected in any 10-bit sample, it is known that 1 of only 6 MSBs is in error (because parity bit was generated using only 6 MSBs of the 10-bit samples). The present inventive method uses an exemplary algorithm based on the finding that only one of the 6 MSBs is in error.

In the specific example above, the algorithm which is used by way of example only and not as a limitation, is based on the following process/sequence:

1. Only 1 of 6 possible parity bits of any erroneous sample could be in error.

2. Expediently, these 6 bits are inverted, only 1 bit at a time, to get 6 modified 10-bit samples for each erroneous sample. Thus, test samples are obtained from the sample sets each containing an inverted bit. Each 10-bit test sample is then expanded to 14-bits.

3. Now, in the stream of 14-bit samples, if any sample is indeed in error, then there are 6 other possible values of the test sample to choose from to arrive at the original (correct) value.

Figure 1:
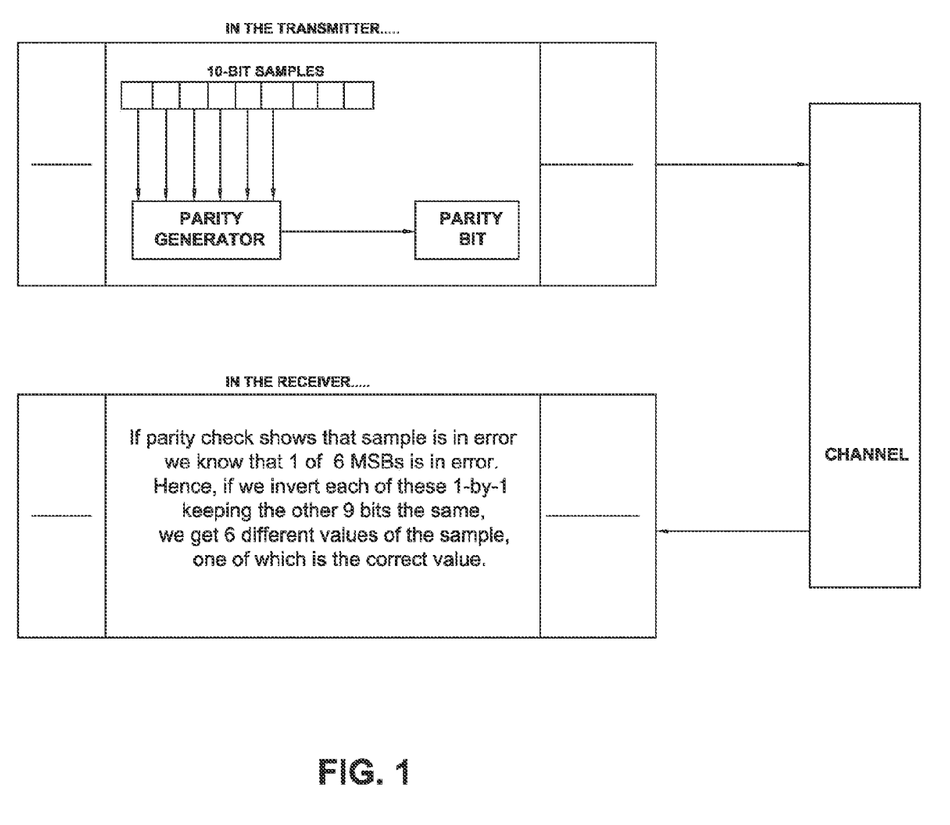
FIG. 1 shows an overview of the transmitter and receiver set up with the transmission channel connecting the two.
Figure 2:
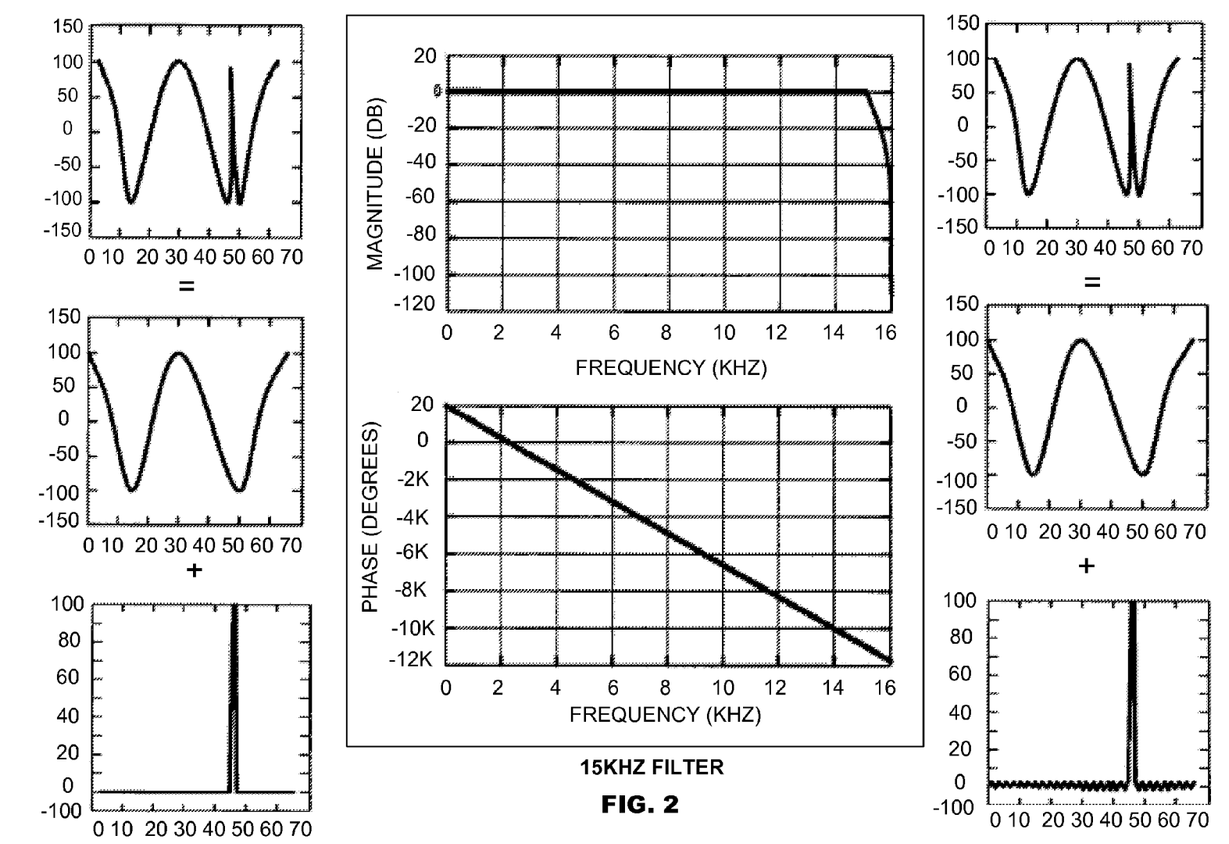
FIG. 2 shows the effect of the filter (whose magnitude and phase response are shown) on an erroneous signal which is considered as the sum of the correct signal and noise, considering the linearity property of the filter.

FIG. 1 illustrates the transmitter end and the receiver end functions (connected by the transmission channel) as related to the parity bit generation at the transmitter, and the handling of the test samples for error detection and correction. To arrive at the correct sample value, the 14-bit samples are passed through a low pass filter, e.g., 15 kHz filter which reduces the error at the erroneous sample by spreading the error across several samples in time, as illustrated in FIG. 2. The 6 possibly correct values of the erroneous sample are passed through the filter one by one, by recording the output of the filter in each case. The filter input and output for each 14 bit sample is noted and the differential between the input and output is assessed. That value of the 14 bit sample where the differential is the least is used as the replacement value for the erroneous signal. The deployment of the filter for effecting correction of the erroneous signal is illustrated in FIGS. 3 and 4 and described in the context of the FIGS. 3 and 4.

Figure 3:
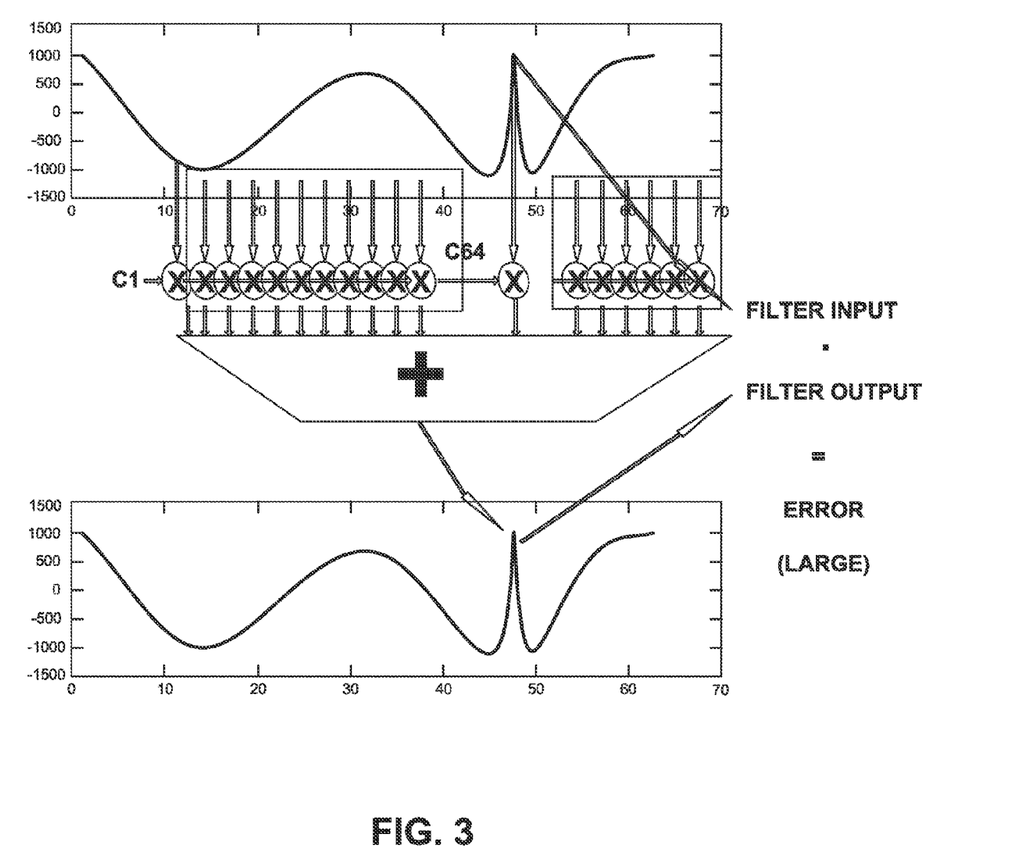
FIGS. 3 and 4 illustrate parity error correction as the distinction between the cases in which a correct signal is passed through the filter and in which an erroneous signal is passed; and, FIG. 5 shows an example of the flow of data through the receiver in the context of the present invention.
Figure 4:
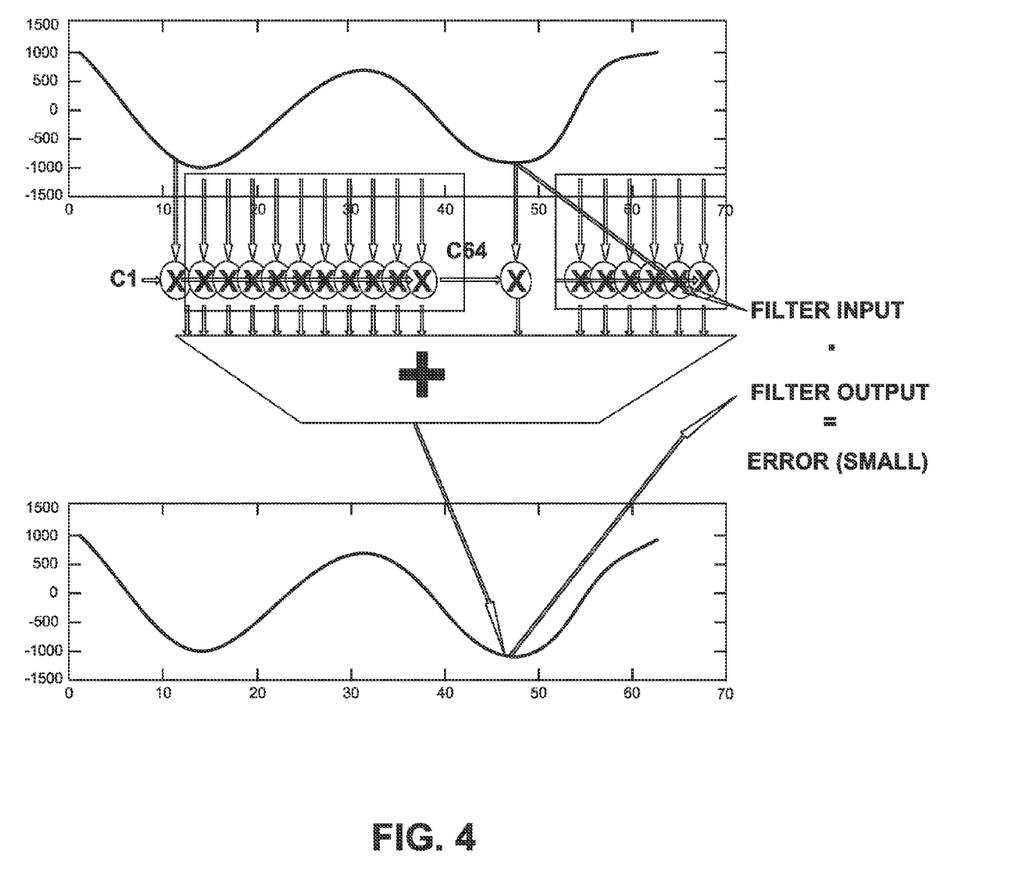

FIG. 3 illustrates the scenario where the difference between the filter input and the filter output at the receiver side (i.e., between the reference sample and the test sample) is large, thereby indicating that the specific sample in question is not the right sample to be chosen for replacement. FIG. 4 illustrates the scenario where the difference between the fitter input and output at the receiver side is minimal, thereby indicating that the specific sample in question is the right sample to be chosen for replacement of the erroneous signal sample. Expressed differently, the values of a specific test sample at the output of the filter and at the input of the filter are offset by a minimum when the value of the test sample is correct, as shown in FIGS. 3 and 4. Thus, in the stream of 14-bit samples, an erroneous sample is replaced with the corrected value (which is one of the 6 modified values, for which offset between filter input and filter output is minimum). It is further noted that as an example, if the filter has P-taps, the correction is accurate in theory, when at any point of time, only one sample in the P-tap filter is in error (which means that the error rate should be low enough to ensure that in any set of P consecutive samples, only one is in error). In practice, it can be stated that the efficiency of correction degrades gradually as the error rate increases (which means that in any set of P consecutive samples, an increasing number of samples is in error).

Figure 5:
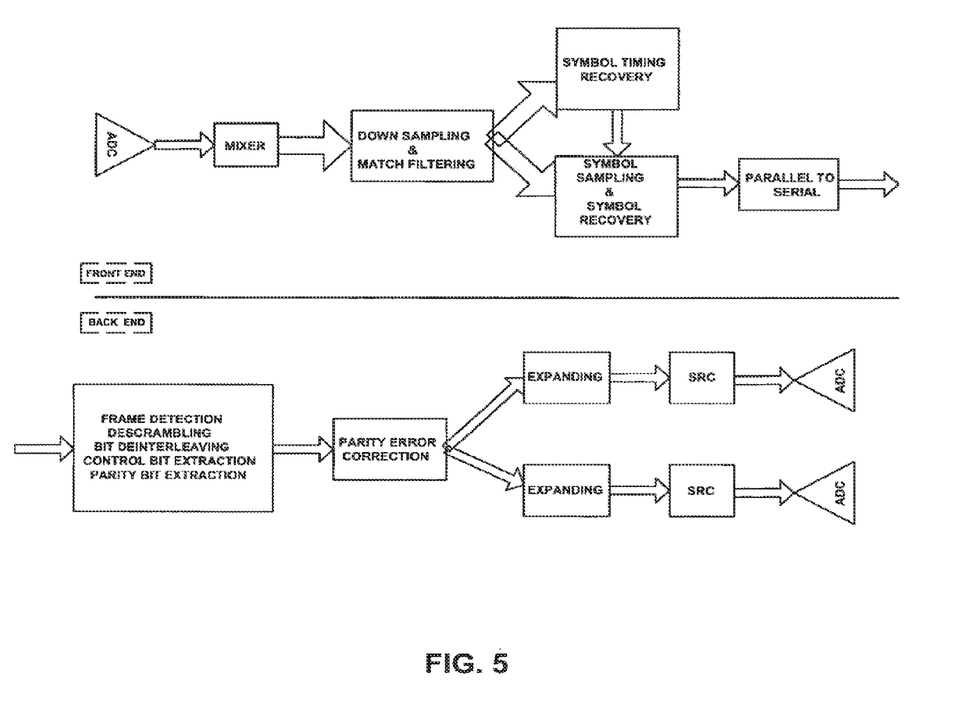

The illustration in FIG. 5 shows an example of the flow of data through the receiver. The analog RF signal that is received is the input to the ADC (analog to digital converter), which converts it into digital samples. With the digital samples of the signal, a purely digital core can be used to process this data. This data is fed into the mixer, where the modulated RF signal is multiplied separately with cosine and sine components of the carrier frequency to generate I (in-phase) and Q (quadrature-phase) components. Following this down sampling and match filtering is done on I and Q components in order to decimate the data to lower sample rate, since the signal is no more at RF. This leads to the symbol recovery block. In digital modulation, a symbol (such as one of 00, 01, 10, and 11) is coded as a particular waveform. Hence, the symbol recovery block does the job of interpreting the symbol from the waveform received. In case these symbols are 2 bits, they need to be passed through a parallel to serial converter in order to pass the bit stream to the back end. In the front end, the bit stream coming in is detected as frames (for which a frame header is searched). Once this is done, descrambling and bit de-interleaving is done to reverse the scrambling and bit interleaving which is done in the transmitter to counter the effects of burst noise in the communication channel. Subsequently, control bits are extracted for a particular frame, and parity bits for each sample are also extracted. Now the samples obtained are passed to the parity error correction. After correction, the samples are expanded based on the information obtained from the control bits. SRC as illustrated in FIG. 5 is a simple Sample Rate Converter to convert the sample rate as required. Finally, these samples are again converted back to analog form to provide the audio output as required.

The following aspects are additionally noted in the context of one implementation of the present technique;
1. With parity error correction the performance is improved from earlier acceptable Rflevel=40 dbuv to Rflevel=36 dbuv.

(Rflevel specified is the energy level of the signal being fed into the receiver)

So, as the energy level decreases, the errors after transmission increase. Hence, the minimum energy of the signal for acceptable decoded audio is found to be lowered by the introduction of the error correction.
2. The hardware added for parity correction is approx 300 k square micrometer of area.
3. The difference in the values of a specific sample at the output of the filter and at the input of the filter is a minimum when the value of the sample is correct.

In the specific application of the present error correction approach in the NICAM demodulator, the following features are to be noted:
1. In the incoming signal stream of 14-bit samples, an erroneous sample is replaced with the corrected value (which is one of the 6 modified values, for which offset between filter input and filter output is minimum).
2. 6 MSBs of each 10 bit sample are parity encoded.
3. Sample rate is 32 kHz, sound bandwidth is 16 kHz, and any error in bits just spreads into the audio bandwidth as noise.
4. Simple filtering can not remove this noise totally.
5. Sample with parity error gives a click sound at the output.
6. With parity error correction, the performance is improved from an earlier acceptable Rflevel=40 dbuv to improved Rflevel=36 dbuv.

The present invention includes a computer readable medium encoded with software data/instruction which when executed by a computing platform would result in execution of a method as described and claimed herein. Different embodiments of the present subject matter can be implemented in software which can be used in any suitable computing environment. The embodiments of the present subject matter are also operable in a number of general-purpose or special-purpose computing environments, or processors or processing units. Some computing environments include personal computers, general-purpose computers, server computers, hand-held devices (including, but not limited to, telephones and personal digital assistants (PDAs) of all types), laptop devices, multi-processors, microprocessors, set-top boxes, programmable consumer electronics, network computers, minicomputers, mainframe computers, distributed computing environments and the like to execute code stored on a computer-readable medium or computer memory elements. The embodiments of the present subject matter may be implemented in part or in whole as machine-executable instructions, such as program modules that are executed by a computer. Generally, program modules include routines, programs, objects, components, data structures, and the like to perform particular tasks or to implement particular abstract data types. In a distributed computing environment, program modules may be located in local or remote storage devices.

Computer memory elements can include any suitable memory device(s) for storing data and machine-readable instructions, such as read only memory (ROM), random access memory (RAM), erasable programmable read only memory (EPROM), electrically erasable programmable read only memory (EEPROM), hard drive, removable media drive for handling compact disks (CDs), digital video disks (DVDs), diskettes, magnetic tape cartridges, memory cards, Memory Sticks™, and the like; and other types of data storage.

"Processor" or "processing unit," as referred to hereinabove, includes any type of computational circuit, such as, but not limited to, a microprocessor, a microcontroller, a complex instruction set computing (CISC) microprocessor, a reduced instruction set computing (RISC) microprocessor, a very long instruction word (VLIW) microprocessor, explicitly parallel instruction computing (EPIC) microprocessor, a graphics processor, a digital signal processor, or any other type of processor or processing circuit. The term also includes embedded controllers, such as generic or programmable logic devices or arrays, application specific integrated circuits, single-chip computers, smart cards, and the like.

In the foregoing detailed description of embodiments of the invention, various features are grouped together in a single exemplary embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the detailed description of embodiments of the invention, with each claim standing on its own as a separate embodiment. It is understood that the above description is intended to be illustrative, and not restrictive. It is intended to cover all alternatives, modifications and equivalents as may be included within the spirit and scope of the invention as defined in the appended claims. Many other embodiments will be apparent to those of skill in the art upon reviewing the above description. The scope of the invention should therefore be determined with reference to the appended claims, along with the full scope of equivalents to which such claims are entitled. In the appended claims, the terms "including" and "in which" where present, are used as the plain-English equivalents of the respective terms "comprising" and "wherein," respectively. Moreover, the terms "first," "second," and "third," etc., if used are merely labels, and are not intended to impose numerical requirements on their objects.

The invention claimed is:

1. A parity error correction method, comprising:
 selecting M bits of an erroneous K-bit sample, the K-bit sample expanded from an N-bit parity encoded sample;
 generating M K-bit test samples, each test sample having an inversion of a respective one of the M bits and keeping all other bits unchanged;
 filtering each of the M test samples to obtain a filtered output for each such test sample;
 determining a minimum difference between each inverted test sample and its corresponding filtered output; and
 based on the minimum difference, choosing the corresponding inverted test sample to replace the erroneous K-bit sample.

2. The method of claim 1, wherein the filtering is performed with a low pass filter.

3. The method of claim 1, wherein the K-bit sample is derived from a band-limited signal.

4. The method of claim 1, wherein N is less than K and M is less than N.

5. The method of claim 1, wherein K is 14, N is 10, and M is 6 most significant parity encoded bits.

6. The method of claim 1, wherein the filtering is to allow a highest estimated frequency of the K-bit sample to be present in a test sample filtered output.

7. The method of claim 1, wherein the K-bit sample is modulated according to a NICAM (Near Instantaneous Companded Audio Multiplexed) modulation.

8. The method of claim 7, wherein the filtering comprises a 15 KHz low pass filter.

9. A parity error correction method, comprising:
 selecting M bits of an erroneous N-bit parity encoded signal, the N-bit parity encoded signal being compressed from a K-bit digital source signal sample and parity encoded;
 generating M N-bit test samples, each test sample having an inversion of a respective one of the M bits and keeping all other bits unchanged;
 filtering each of the M test samples to obtain a filtered output for each such test sample;
 determining a minimum difference between each inverted test sample and its corresponding filtered output; and
 based on the minimum difference, choosing the corresponding inverted test sample to replace the erroneous N-bit sample.

10. The method of claim 9, wherein the filtering is performed with a low-pass filter.

11. The method of claim 9, wherein the K-bit digital source signal sample is derived from a band-limited signal.

12. The method of claim 9, wherein N is less than K and M is less than N.

13. The method of claim 9, wherein K is 14, N is 10, and M is 6 most significant parity encoded bits.

14. The method of claim 9, wherein the filtering is to allow a highest estimated frequency of the K-bit digital source signal sample to be present in a test sample filtered output.

15. The method of claim 9, wherein the K-bit digital source signal sample is modulated according to a NICAM (Near Instantaneous Companded Audio Multiplexed) modulation.

16. The method of claim 15, wherein the filtering comprises a 15 KHz low pass filter.

17. A non-transitory computer-readable medium including instructions adapted to execute a parity error correction method, the method comprising:
 selecting M bits of an erroneous K-bit sample, the K-bit sample expanded from an N-bit parity encoded sample;
 generating M K-bit test samples, each test sample having an inversion of a respective one of the M bits and keeping all other bits unchanged;
 filtering each of the M test samples to obtain a filtered output for each such test sample;
 determining a minimum difference between each inverted test sample and its corresponding filtered output; and
 based on the minimum difference, choosing the corresponding inverted test sample to replace the erroneous K-bit sample.

18. The non-transitory computer readable medium of claim 17, wherein the filtering is performed with a low pass filter.

19. The non-transitory computer readable medium of claim 17, wherein the K-bit sample is derived from a band-limited signal.

20. The non-transitory computer-readable medium of claim 17, wherein N is less than K and M is less than N.

21. A non-transitory computer-readable medium including instructions adapted to execute a parity error correction method, the method comprising:
 selecting M bits of an erroneous N-bit parity encoded signal, the N-bit parity encoded signal being compressed from a K-bit digital source signal sample and parity encoded;
 generating M N-bit test samples, each test sample having an inversion of a respective one of the M bits and keeping all other bits unchanged;
 filtering each of the M test samples to obtain a filtered output for each such test sample;
 determining a minimum difference between each inverted test sample and its corresponding filtered output; and
 based on the minimum difference, choosing the corresponding inverted test sample to replace the erroneous N-bit sample.

22. The non-transitory computer-readable medium of claim 21, wherein the filtering is performed with a low-pass filter.

23. The non-transitory computer-readable medium of claim 21, wherein the K-bit digital source signal sample is derived from a band-limited signal.

24. The non-transitory computer-readable medium of claim 21, wherein N is less than K and M is less than N.

* * * * *